United States Patent
Qi et al.

(10) Patent No.: US 10,646,015 B1
(45) Date of Patent: *May 12, 2020

(54) SMART LUGGAGE SYSTEM WITH CAMERA INSTALLED IN PULL ROD

(71) Applicant: LINGDONG TECHNOLOGY (BEIJING) CO. LTD, Beijing (CN)

(72) Inventors: Ou Qi, Beijing (CN); Xudong Guo, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/569,366

(22) Filed: Sep. 12, 2019

Related U.S. Application Data

(63) Continuation of application No. 16/250,740, filed on Jan. 17, 2019, which is a continuation of application No. PCT/CN2019/070389, filed on Jan. 4, 2019.

(51) Int. Cl.
| | |
|---|---|
| A45C 15/00 | (2006.01) |
| A45C 13/28 | (2006.01) |
| G05D 1/02 | (2020.01) |
| A45C 5/03 | (2006.01) |
| A45C 13/26 | (2006.01) |
| A45C 5/14 | (2006.01) |

(52) U.S. Cl.
CPC ............... *A45C 13/28* (2013.01); *A45C 5/03* (2013.01); *A45C 5/14* (2013.01); *A45C 13/262* (2013.01); *G05D 1/0246* (2013.01); *A45C 2005/148* (2013.01)

(58) Field of Classification Search
CPC ........... A45C 5/14; A45C 5/03; A45C 13/262; A45C 15/00; A45C 2005/148; B62B 2202/24; B62B 2205/145; B62B 5/0033; G05D 1/0088; G05D 1/0251; G05D 2201/0212; B60K 7/007; B60K 7/00; B60K 2007/0076
USPC .................. 701/2; 180/65.51, 6.5, 19.1, 167
See application file for complete search history.

(56) References Cited

U.S. PATENT DOCUMENTS

| 5,219,264 A | 6/1993 | McClure et al. |
| 5,316,096 A | 5/1994 | Good |

(Continued)

FOREIGN PATENT DOCUMENTS

| CN | 101223070 A | 7/2008 |
| CN | 103376803 A | 10/2013 |

(Continued)

OTHER PUBLICATIONS

COWA ROBOT. "COWAROBOT R1: The First Robotic Suitcase." YouTube, Jul. 20, 2016, https://www.youtube.com/watch?v=CI2KeIDN-fQ&t=3s.

(Continued)

*Primary Examiner* — Dalena Tran
(74) *Attorney, Agent, or Firm* — Patterson & Sheridan, L.L.P.

(57) ABSTRACT

A smart luggage system includes a piece of luggage configured to store items for transport and a handle coupled to the luggage. The handle includes a pull rod coupled to a connecting rod. One or more cameras are disposed in a top portion of the pull rod and configured to take a photograph and/or video. One or more cameras are coupled to the luggage and/or the handle and configured to take a photograph and/or video.

17 Claims, 16 Drawing Sheets

(56) References Cited

U.S. PATENT DOCUMENTS

| | | |
|---|---|---|
| 6,491,127 B1 | 12/2002 | Holmberg et al. |
| 7,210,545 B1 | 5/2007 | Waid |
| 7,249,643 B2 | 7/2007 | Etzioni et al. |
| 8,453,771 B1 | 6/2013 | Hirschfeld |
| 8,909,368 B2 | 12/2014 | D'Andrea et al. |
| 9,215,561 B1 | 12/2015 | Arman |
| 9,643,638 B1 | 5/2017 | Wittliff, III |
| 9,661,905 B2 | 5/2017 | O'Donnell et al. |
| 9,874,308 B2 | 1/2018 | Saika et al. |
| 10,271,623 B1 | 4/2019 | Qi et al. |
| 2006/0086569 A1* | 4/2006 | Brown, Sr. ............ A01M 31/02 182/63.1 |
| 2006/0208440 A1* | 9/2006 | Clark ...................... B62B 3/001 280/47.35 |
| 2007/0080000 A1 | 4/2007 | Tobey et al. |
| 2008/0041644 A1* | 2/2008 | Tudek .................... B60L 7/12 180/65.1 |
| 2010/0252338 A1 | 10/2010 | Xie |
| 2014/0002239 A1 | 1/2014 | Rayner |
| 2014/0107868 A1 | 4/2014 | DiGiacomcantonio et al. |
| 2014/0142757 A1 | 5/2014 | Ziegler et al. |
| 2014/0277841 A1 | 9/2014 | Klicpera et al. |
| 2015/0012163 A1 | 1/2015 | Crawley |
| 2015/0025708 A1 | 1/2015 | Anderson |
| 2016/0327383 A1 | 11/2016 | Becker et al. |
| 2017/0049202 A1 | 2/2017 | Nascimento |
| 2017/0086549 A1 | 3/2017 | Caputo et al. |
| 2017/0174096 A1 | 6/2017 | Wang |
| 2017/0220040 A1 | 8/2017 | London |
| 2017/0334516 A1 | 11/2017 | Ferguson |
| 2018/0278190 A1 | 9/2018 | Cerboneschi |
| 2018/0360177 A1 | 12/2018 | Kovtun et al. |
| 2019/0037994 A1 | 2/2019 | Herrmann |

FOREIGN PATENT DOCUMENTS

| | | |
|---|---|---|
| CN | 104085313 A | 10/2014 |
| CN | 204378181 U | 6/2015 |
| CN | 105022396 A | 11/2015 |
| CN | 105717927 A | 6/2016 |
| CN | 205390655 U | 7/2016 |
| CN | 206249095 U | 6/2017 |
| CN | 107640016 A | 1/2018 |
| CN | 207370256 U | 5/2018 |
| CN | 207374107 U | 5/2018 |
| CN | 207676376 U | 7/2018 |
| DE | 19949351 A1 | 7/2001 |
| JP | 2002255037 A | 9/2002 |
| JP | 2011006314 A | 1/2011 |
| KR | 20120060064 A | 6/2012 |

OTHER PUBLICATIONS

Travelmate. "This Futuristic Robot Suitcase Moves on Its Own and Follows You." YouTube, Oct. 6, 2016, https://www.youtube.com/watch?v=Ai5haQmC97o.

90Fun. "90Fun Puppy1, The World's 1st Self-balance & Auto-follow Suitcase." YouTube, Jan. 9, 2018, https://www.youtube.com/watch?v=7KX5cYfNsnc.

International Search Report and Written Opinion for International Application No. PCTlCN2018/096545 dated Oct. 24, 2018.

International Search Report and Written Opinion for International Application No. PCTlCN20181096544 dated Oct. 24, 2018.

International Search Report and Written Opinion for International Application No. PCT/CN2018/110184 dated Jan. 16, 2019.

* cited by examiner

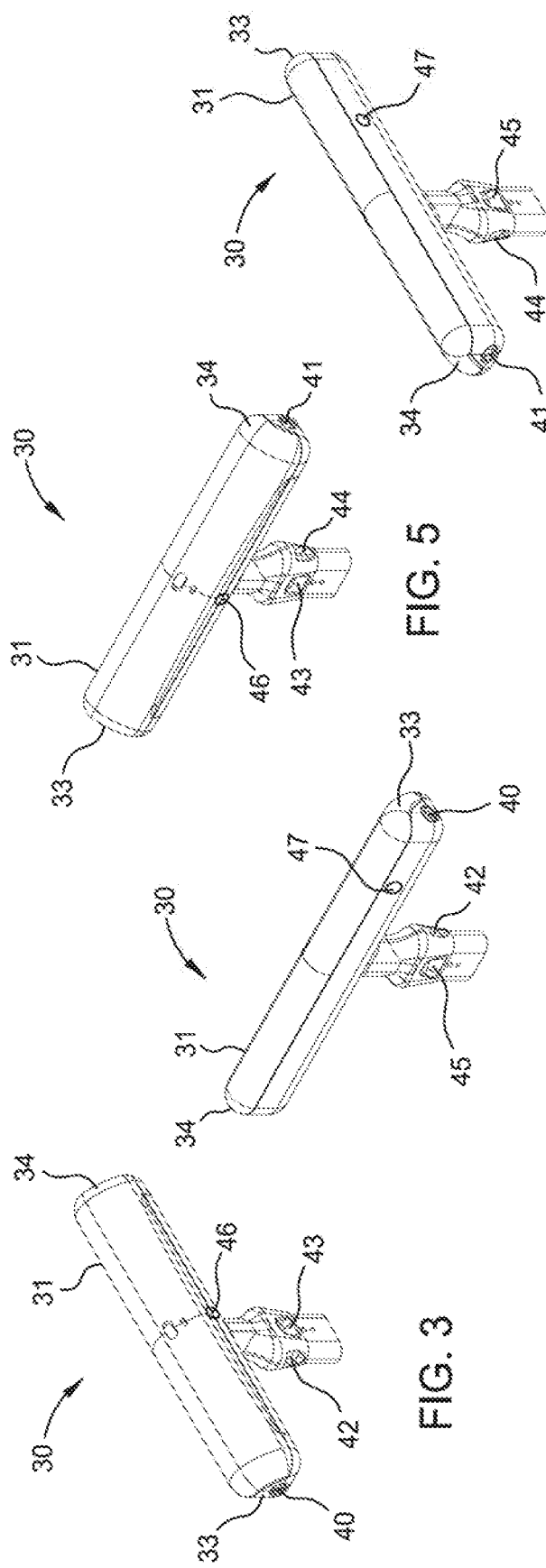

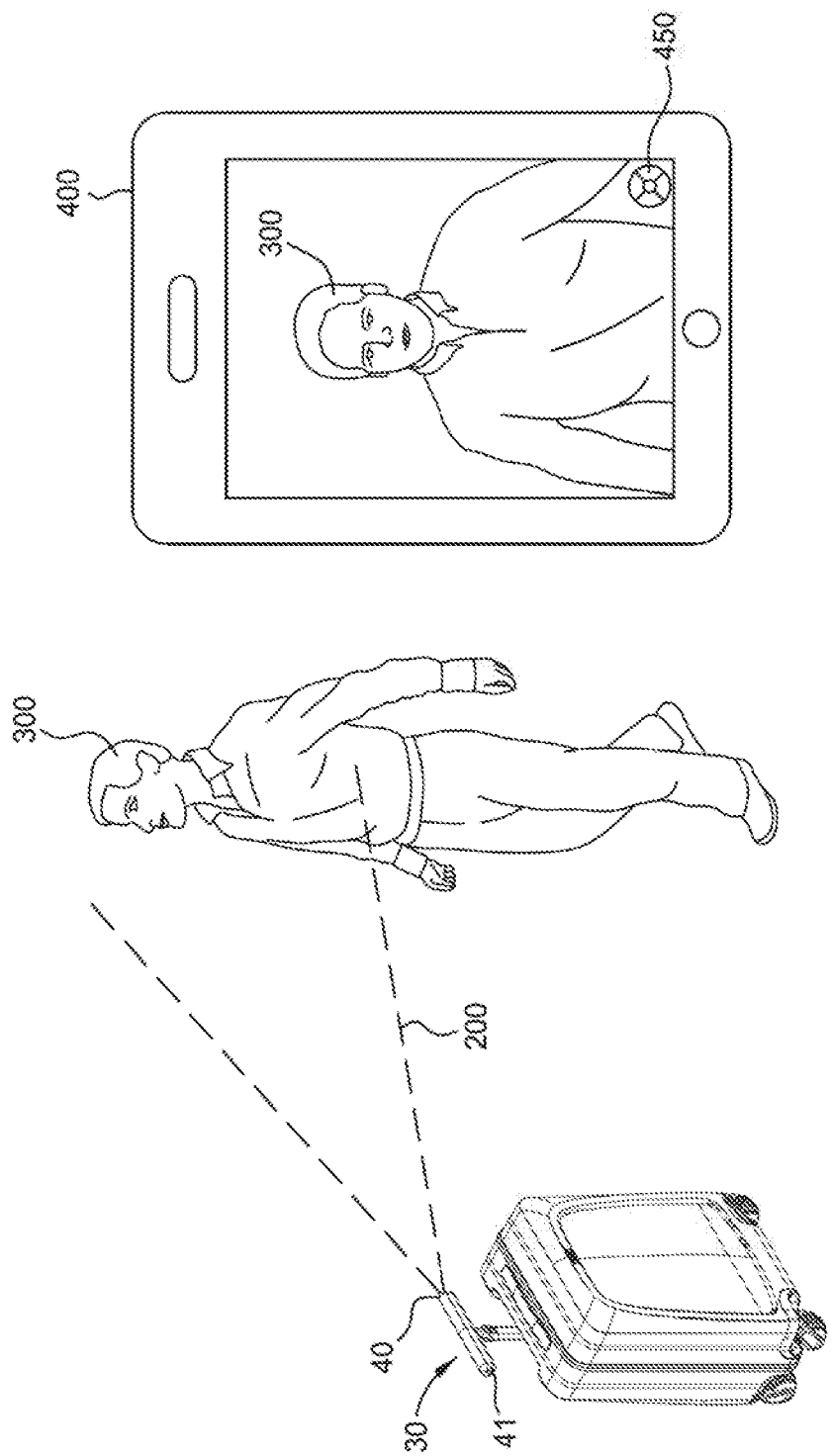

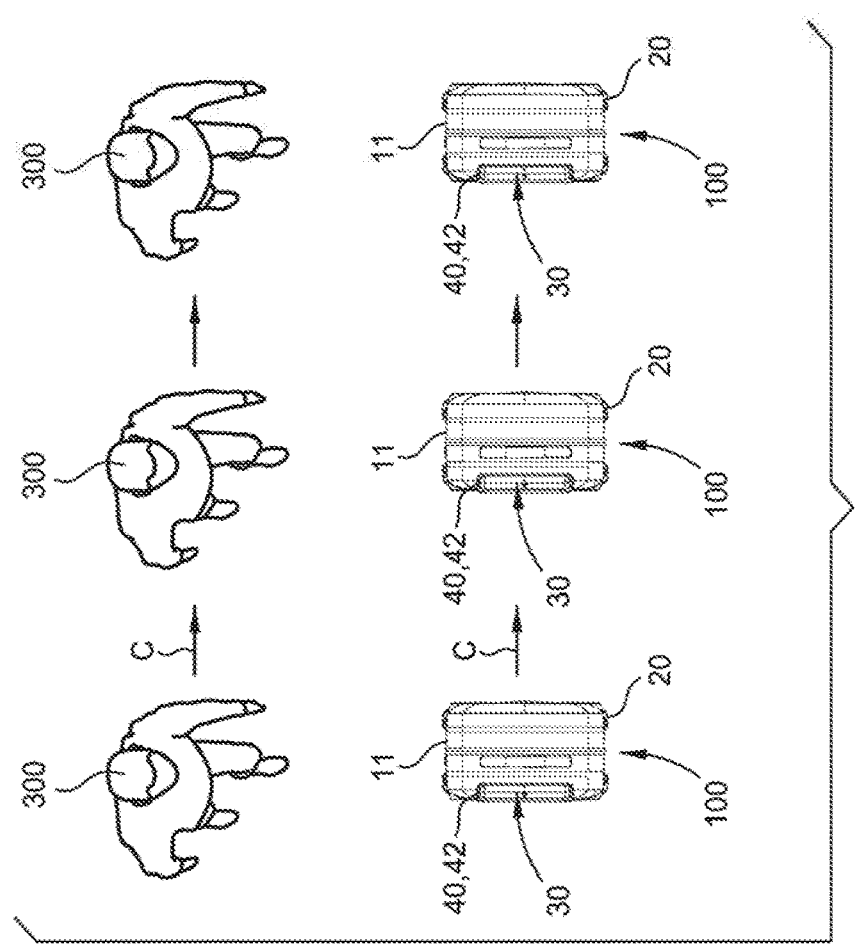
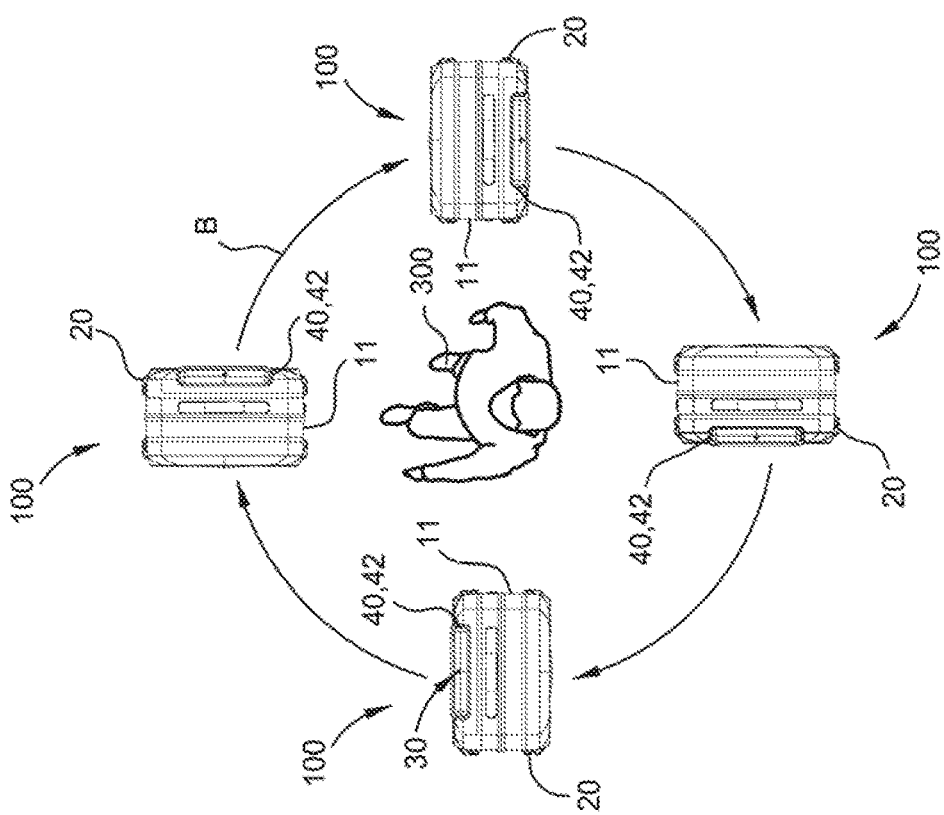
FIG. 13
FIG. 12

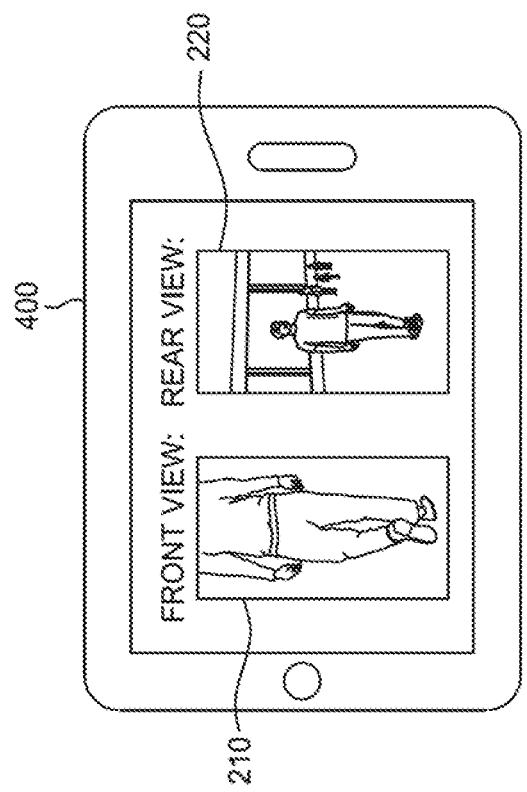
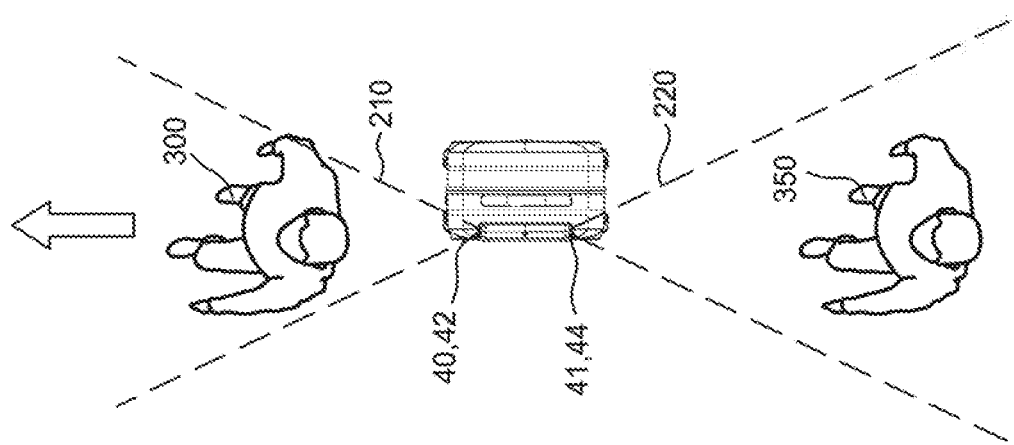
FIG. 14

SMART LUGGAGE SYSTEM WITH CAMERA INSTALLED IN PULL ROD

BACKGROUND

Field

Embodiments disclosed herein relate to a smart luggage system having a camera installed in a top portion of the pull rod.

Description of the Related Art

Current self-driving luggage designs have cameras located on the body of the luggage that are used for proximity sensing to avoid obstacles, especially when being used in crowded places like airports, hotels, or a busy sidewalk. The cameras on these self-driving luggage designs often have a narrow viewing range, are easily obstructed, and are limited in their capability. Therefore there is a continuous need for new and improved smart luggage systems.

SUMMARY

In one embodiment, a smart luggage system comprises a piece of luggage configured to store items for transport; a handle coupled to the luggage, wherein the handle includes a pull rod coupled to a connecting rod; and an upper camera disposed in a top portion of the pull rod.

In one embodiment, a method of taking a photograph and/or video using a smart luggage system comprises moving a handle of the smart luggage system from a collapsed position to an extended position, wherein the handle includes a pull rod coupled to a connecting rod, and wherein a camera is disposed in a top portion of the pull rod; viewing an object that is within a viewing range of the camera on a personal user device; and taking a photograph and/or video of the object using the camera.

In one embodiment, a method of taking a photograph and/or video using a smart luggage system comprises activating a camera on the smart luggage system to take a photograph and/or video; communicating a real-time image of an object that is within a viewing range of the camera to a personal user device; taking a photograph and/or video of the object using the camera; and communicating the photograph and/or video of the object to the personal user device.

BRIEF DESCRIPTION OF THE DRAWINGS

FIGS. 3, 4, 5, and 6 are different perspective views of a handle of the smart luggage system according to one embodiment.

FIG. 11 is a schematic view of the smart luggage system taking a photograph and/or video and displaying the photograph and/or video on a personal user device.

FIG. 12 is a plan view of the smart luggage system moving along a 360 degree path about a user according to one embodiment.

FIG. 13 is a plan view of the smart luggage system moving along a path that is parallel to a path of a user according to one embodiment.

FIG. 14 is a schematic view of the smart luggage system recording front and rear views and displaying the front and rear views on a personal user device.

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the disclosure include a smart luggage system that is self-driving and has one or more motorized wheel assemblies. The smart luggage system is configured to autonomously follow any type of object, such as a user, moving in a given direction. Although the embodiments of the smart luggage system are described and illustrated herein with respect to a suitcase, the embodiments may be used with other types of portable equipment, such as a shopping cart.

In one embodiment, the smart luggage system has one or more cameras installed in the pull rod of the handle. The cameras are configured to take photographs and/or videos, and send the photographs and/or videos to a personal user device, including but not limited to a cellular phone, a tablet, a wristband, and a computer. The cameras are also configured to help guide the smart luggage system when following an object, such as a user, in a rear follow position or a side follow position.

Figure 1:
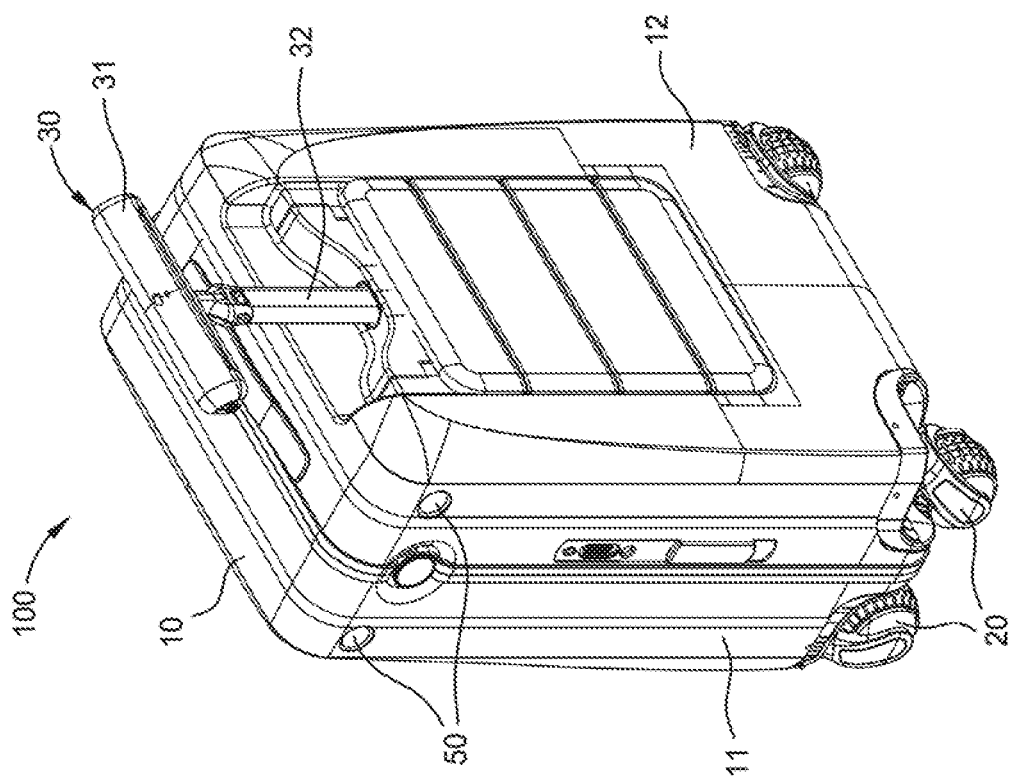
FIGS. 1 and 2 are perspective views of a smart luggage system according to one embodiment.
Figure 2:
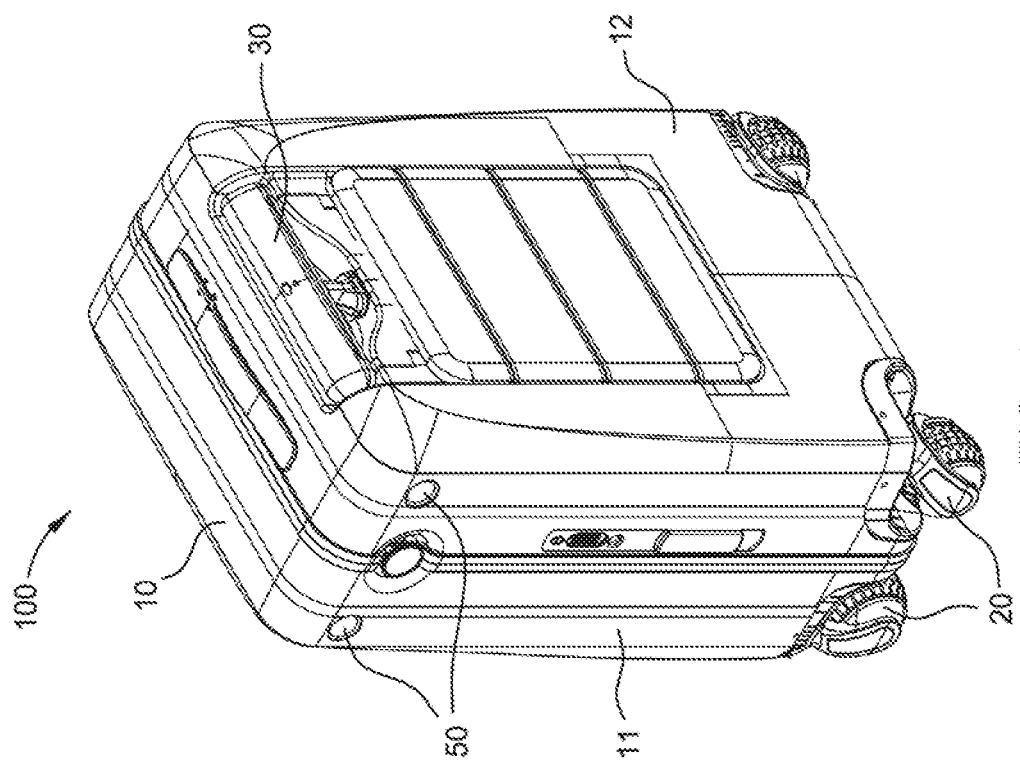

FIGS. 1 and 2 are perspective views of a smart luggage system 100 according to one embodiment. The smart luggage system 100 includes a body in the form of a piece of luggage 10, such as a suitcase, that can be used to store items for transport. The luggage 10 is supported by four wheel assemblies 20. Each wheel assembly 20 is configured to rotate in a given direction and roll in the given direction. Each wheel assembly 20 is motorized to move the luggage 10 in a given direction.

In one embodiment, the luggage 10 is supported by two, three, or more wheel assemblies 20. In one embodiment, two, three, or more of the wheel assemblies 20 are motorized to move the luggage in a given direction. In one embodiment, the wheel assemblies 20 are caster-type wheels.

The system 100 includes one or more proximity sensors 50 coupled to the luggage 10. Two proximity sensors 50 are shown coupled to a front side 11 of the luggage 10 near the top end of the luggage 10. Any number of proximity sensors 50 can be used and located at different positions and/or on any side of the luggage 10. The proximity sensors 50 are configured to detect the proximity of one or more objects relative to the luggage 10, and may include but are not limited to ultrasonic sensors, sonar sensors, infrared sensors, radar sensors, and/or LiDAR sensors.

A handle 30 is coupled to the luggage 10, and is configured to allow a user to push, pull, and/or lift the luggage 10. A user can move the handle 30 between a collapsed position as shown in FIG. 1 and an extended position as shown in FIG. 2. The handle 30 is located on a right side 12 of the luggage 10, but alternatively can be located on the opposite side. The handle 30 includes a pull rod 31 coupled to a connecting rod 32, which is coupled to the luggage 10. The pull rod 31 forms a "T" shape. One or more cameras are installed in the pull rod 31 as further described below.

FIGS. 3, 4, 5, and 6 are different perspective views of the handle 30 of the smart luggage system according 100 to one embodiment. One or more upper cameras 40, 41, 46, 47 are coupled to the top portion of the pull rod 31. One or more lower cameras 42, 43, 44, 45 are coupled to the bottom portion of the pull rod 31. The top portion of the pull rod 31 is an elongated portion that is oriented horizontally and perpendicular to the bottom portion of the pull rod 31, which bottom portion is oriented vertically relative to the top portion.

In one embodiment, the upper cameras 40, 41, 46, 47 are configured to detect and record, such as take photographs and/or videos, of nearby objects. In one embodiment, the lower cameras 42, 43, 44, 45 are configured to detect the proximity of objects relative to the luggage 10. For example, the lower cameras 42, 43, 44, 45 include an optical filter configured to identify invisible light/laser to help calculate the proximity of nearby objects. In one embodiment, the upper cameras 40, 41, 46, 47 are configured to take photographs and/or videos (for user recognition as one example) of nearby objects, and the lower cameras 42, 43, 44, 45 are configured to detect the proximity of nearby objects (for proximity sensing as one example). Embodiments of the smart luggage system include any combination, number, and/or location of upper and/or lower cameras 40-47 coupled to the pull rod 31 as described herein.

The upper camera 40 is disposed in the top portion of the pull rod 31, and specifically is located at a front end 33 of the pull rod 31 facing a front view. The upper camera 41 is disposed in the top portion of the pull rod 31, and specifically is located at a rear end 34 of the pull rod 31 facing a rear view. The upper camera 46 is disposed in the top portion of the pull rod 31, and specifically is located at the center and on one side (e.g. the right side) of the pull rod 31 facing a side view. The upper camera 47 is disposed in the top portion of the pull rod 31, and specifically is located on an opposite side (e.g. the left side) of the pull rod 31 at a location closer to the front end 33.

Additionally or alternatively, the upper camera 46 can be located closer to the front end 33 and/or the rear end 34 of the pull rod 31. Additionally or alternatively, the upper camera 47 can be located closer to the rear end 34 and/or centrally located on the side of the pull rod 31. Additionally or alternatively, the upper cameras 46 and/or 47 may instead be a control button configured to power on/off the smart luggage system 100.

The lower camera 42 is disposed in the bottom portion of the pull rod 31, and specifically is located facing the front view similar to the upper camera 40. The upper camera 44 is disposed in the bottom portion of the pull rod 31, and specifically is located facing the rear view similar to the upper camera 41. The lower camera 43 is disposed in the bottom portion of the pull rod 31, and specifically is located facing the side view similar to the upper camera 46. The lower camera 45 is disposed in the bottom portion of the pull rod 31, and specifically is located facing the side view similar to the upper camera 47.

Figure 7:
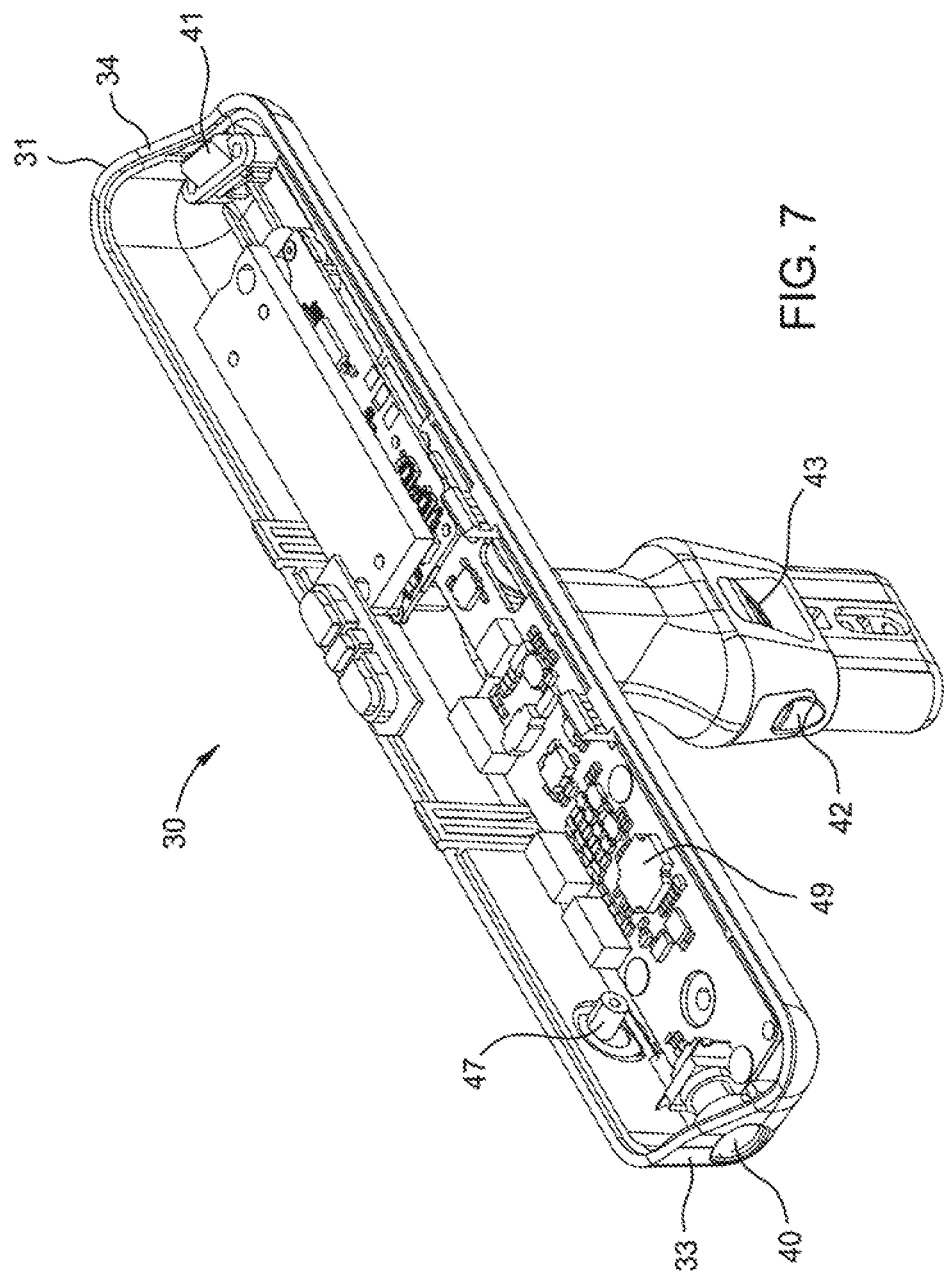
FIG. 7 is a perspective view of the interior of the handle according to one embodiment.

FIG. 7 is a perspective view of the handle 30 with a cover of the top portion removed and showing the interior of the top portion of the pull rod 31. As shown, the upper cameras 40, 41 are disposed in the top portion of the pull rod 31 and located at the front and rear ends 33, 34 facing toward the front and toward the rear, respectively. The upper camera 47 (additionally or alternatively the control button) is shown disposed in the top portion of the pull rod 31 facing toward the side. The lower cameras 42, 43 are disposed in the bottom portion of the pull rod 31 facing the front and side, respectively. The top portion of the pull rod 31 supports any number of components, such as a central processing unit ("CPU") 49, configured to help with the operation of the smart luggage system 100 as further described below.

Advantages of installing the cameras 40-47 in the pull rod 31 of the handle 30 include but are not limited to: (1) better protection for the cameras when the luggage 10 is being transported, (2) the height of the cameras can be adjusted based on a user's height or preference, (3) the cameras are less likely to be vision blocked, and (4) better accuracy of people following using two sets of cameras, upper cameras for user recognition and lower cameras for proximity sensing.

Figure 8:
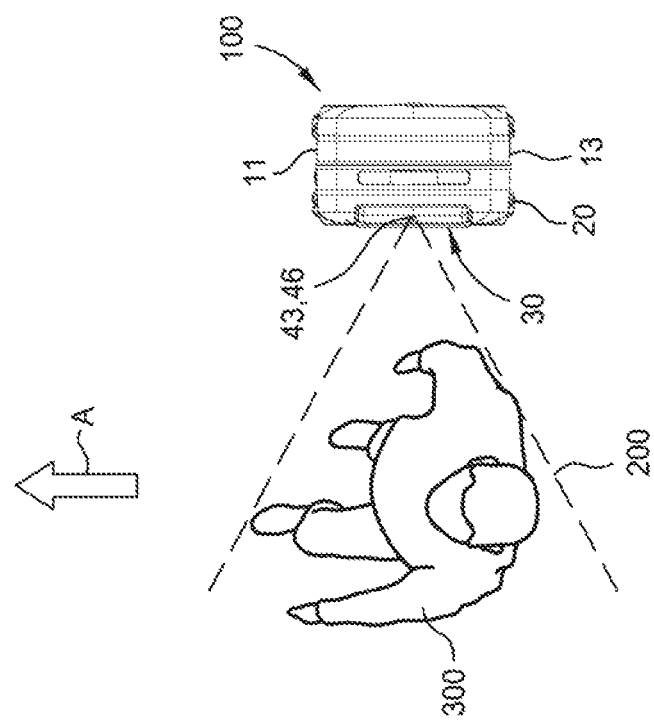
FIG. 8 is a plan view of the smart luggage system following a user in a side follow position according to one embodiment.

FIG. 8 is a plan view of the smart luggage system 100 following a user 300 in a side follow position according to one embodiment. When the handle 30 is in the extended position (as shown in FIG. 2), the upper camera 46 and/or the lower camera 43 can be used to detect and/or record the movement of the user 300 when within a viewing range 200 of the cameras 46, 43. The cameras 46, 43 are configured to help maintain the smart luggage system 100 in the side follow position (e.g. next to or on the side of the user 300) as the user 300 moves in a given direction as indicted by reference arrow "A". As shown, the combination of the wheel assemblies 20 and the cameras 43, 46 are configured to keep the front side 11 of the smart luggage system 100 facing forward in the given direction while moving in the side follow position. When the handle 30 is in the collapsed position (as shown in FIG. 1) the upper camera 46 can be used to maintain the smart luggage system 100 in the side follow position as discussed above.

Figure 9:
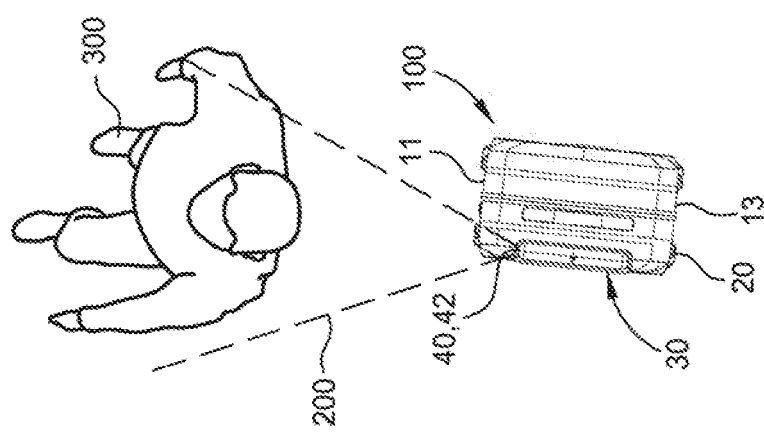
FIG. 9 is a plan view of the smart luggage system following a user in a rear follow position according to one embodiment.

FIG. 9 is a plan view of the smart luggage system 100 following the user 300 in the rear follow position according to one embodiment. When the handle 30 is in the extended position (as shown in FIG. 2), the upper camera 40 and/or the lower camera 42 can be used to detect and/or record the movement of the user 300 when within the viewing range 200 of the cameras 40, 42. The cameras 40, 42 are configured to help maintain the smart luggage system 100 in the rear follow position (e.g. behind the user 300) as the user 300 moves in the given direction as indicted by reference arrow "A". As shown, the combination of the wheel assemblies 20 and the cameras 40, 42 are configured to keep the front side 11 of the smart luggage system 100 facing forward in the given direction while moving in the rear follow position.

Figure 10:
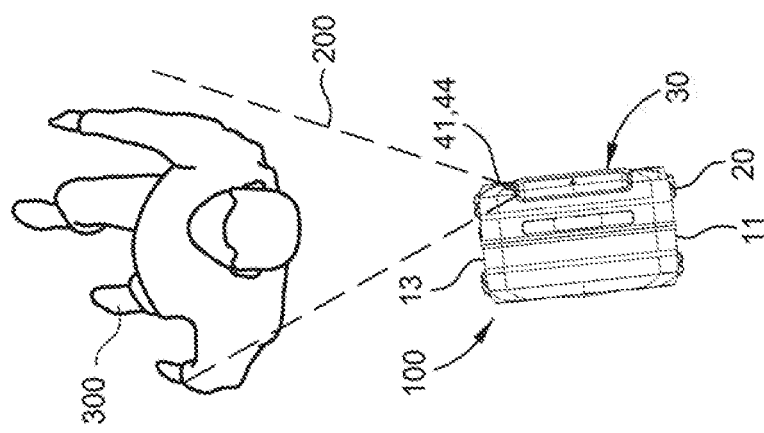
FIG. 10 is a plan view of the smart luggage system following a user in another rear follow position according to one embodiment.

FIG. 10 is a plan view of the smart luggage system 100 following the user 300 in another rear follow position according to one embodiment. When the handle 30 is in the extended position (as shown in FIG. 2), the upper camera 41 and/or the lower camera 44 can be used to detect and/or record the movement of the user 300 when within the viewing range 200 of the cameras 41, 44. The cameras 41, 44 are configured to help maintain the smart luggage system 100 in the rear follow position (e.g. behind the user 300) as the user 300 moves in the given direction as indicted by reference arrow "A". As shown, the combination of the wheel assemblies 20 and the cameras 41, 44 are configured to keep the rear side 13 of the smart luggage system 100 facing forward in the given direction while moving in the rear follow position.

FIG. 11 is a schematic view of the smart luggage system 100 taking a photograph and/or video using any one or all of the upper cameras 40, 41. The smart luggage system 100 is configured to take and communicate the photograph and/or video to a personal user device 400, such as a cellular phone and/or tablet, where the user can view the photograph and/or video. To help take the photograph and/or video, the height of the upper cameras 40, 41 can be adjusted by adjusting the height of the handle 30 relative to the smart luggage system 100. The user 300 can control the movement of the smart luggage system 100 using a control feature 450 on the screen of the personal user device 400 while the image within the viewing range of the upper cameras 40, 41 is displayed on the personal user device 400 to find the best position to take the photograph and/or video. The user 300 can also use the control feature 450 to operate the upper cameras 40, 41 to take the photograph and/or video. The upper cameras 40, 41 are also configured to turn 90 degrees to better fit the image of the user 300 when taking a selfie photograph and/or video. In this manner, the smart luggage system 100 can be used to take a selfie photograph and/or video, while being able to adjust the position, without the assistance of another person.

FIG. 12 is a plan view of the smart luggage system 100 using an auto-framing mode to move in a given direction as indicated by reference arrow "B" (e.g. a 360 degree path) about the user 300 while maintaining the front side 11 of the smart luggage system 100 facing the user 300 at all times. When the handle 30 is in the extended position (as shown in FIG. 2), the upper camera 40 and/or the lower camera 42 can be used to detect and/or record the user 300 as the user 300 remains stationary. Activating the auto-framing mode of the upper camera 40 and/or the lower camera 42 enables the smart luggage system 100 to autonomously find the user 300 and put the user 300 in the middle of the photograph and/or video by itself. The combination of the wheel assemblies 20 and the cameras 40, 42 are configured to keep the front side 11 of the smart luggage system 100 facing the user 300 while moving in the given direction about the user 300.

FIG. 13 is a plan view of the smart luggage system 100 using an auto-framing mode to move in a given direction as indicated by reference arrow "C" (e.g. in a sideways direction) while maintaining the front side 11 of the smart luggage system 100 facing the user 300 at all times. When the handle 30 is in the extended position (as shown in FIG. 2), the upper camera 40 and/or the lower camera 42 can be used to detect and/or record the user 300 as the user 300 moves sideways. Activating the auto-framing mode of the upper camera 40 and/or the lower camera 42 enables the smart luggage system 100 to autonomously find the user 300 and put the user 300 in the middle of the photograph and/or video by itself. The combination of the wheel assemblies 20 and the cameras 40, 42 are configured to keep the front side 11 of the smart luggage system 100 facing the user 300 while moving sideways with the user 300.

In one embodiment, a method of taking a photograph and/or video using the smart luggage system 100 comprises moving the handle 30 from a collapsed position to an extended position (as shown in FIGS. 1 and 2, respectively). The method further comprises viewing an object (e.g. the user 300) that is within a viewing range of the upper cameras 40 and/or 41 on the personal user device 400. The method further comprises taking the photograph and/or video of the object using the upper cameras 40 and/or 41. The method further comprises moving the smart luggage system 100 using the control feature 450 on the personal user device 400. The method further comprises operating the upper cameras 40 and/or 41 to take the photograph and/or video using the control feature 450. The method further comprises activating an auto-framing mode using the control feature 450 such that the smart luggage system 100 autonomously moves and puts the object in the middle of the photograph and/or video. The method further comprises adjusting the upper cameras 40 and/or 41 by adjusting a height of the handle 30.

FIG. 14 is a schematic view of the smart luggage system 100 while in the rear follow position relative to the user 300. The upper and/or lower cameras 40, 42 are configured to detect and/or record images within a front viewing range 210, such as the user 300. At the same time, the upper and/or lower cameras 41, 44 are configured to detect and/or record images within a rear viewing range 220, such as another person 350. The smart luggage system 100 is configured to take real time photographs and/or videos using the cameras 40, 41, 42, 44, and communicate the real time photographs and/or videos to the personal user device 400, such as a cellular phone and/or tablet. The user 300 can simultaneously view real time images within the front viewing range 210 and the rear viewing range 220 on the personal user device 400.

Figure 15:
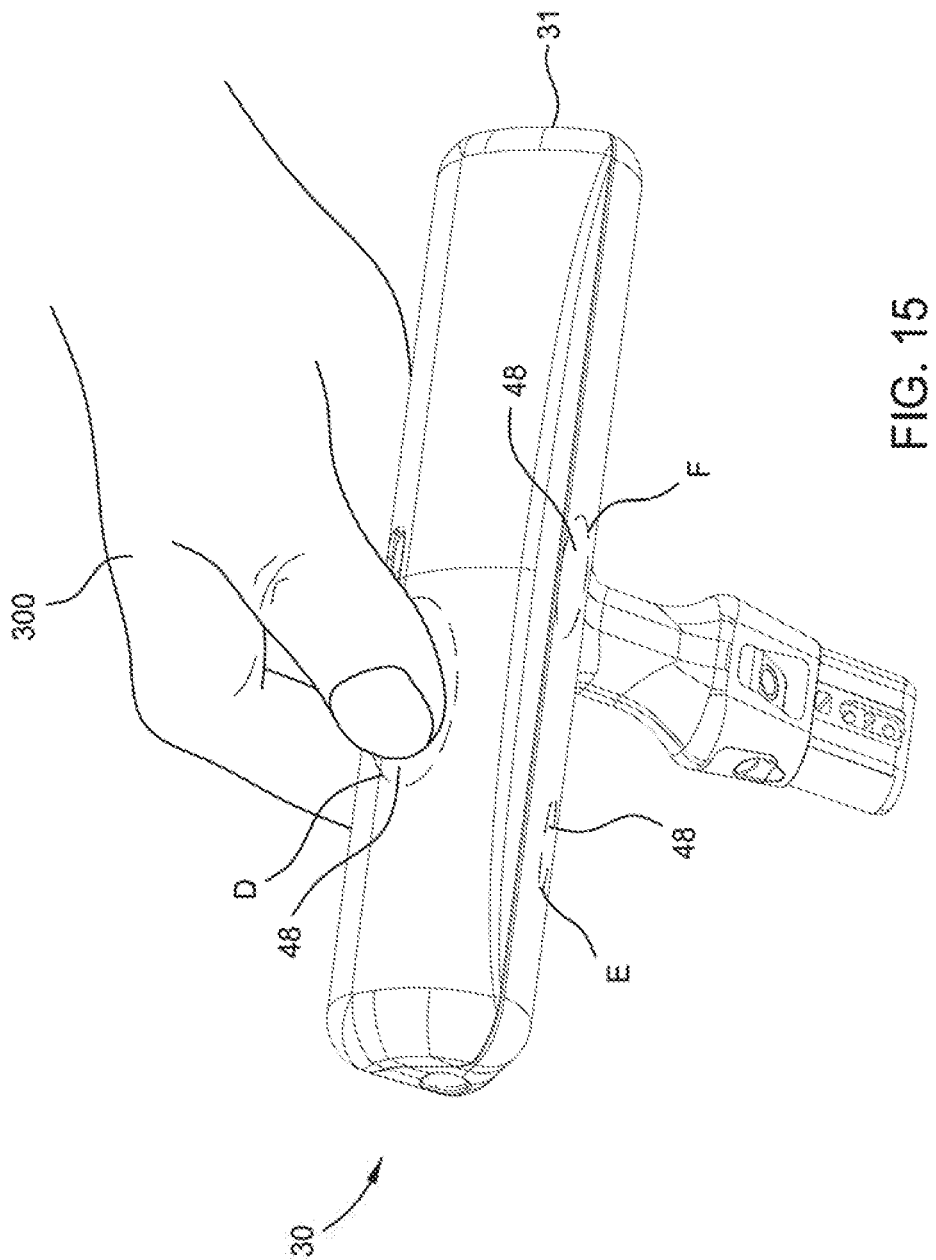
FIGS. 15 and 16 are schematic views of different locations of a control button of the handle of the smart luggage system.
Figure 16:
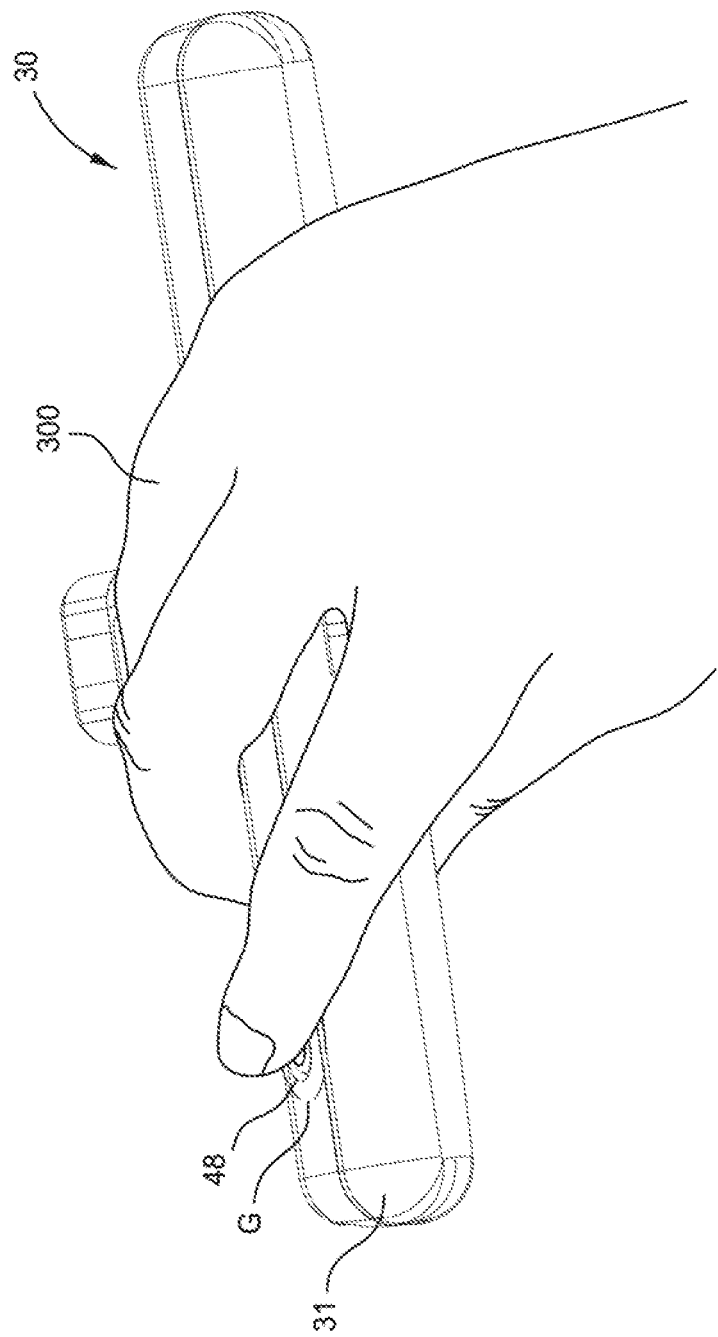

FIGS. 15 and 16 are schematic views of different locations where a control button 48 can be located on the pull rod 31 of the handle 30 of the smart luggage system 100. The control button 48 is configured to power on/off the smart luggage system 100, and/or to switch the smart luggage system 100 between autonomous control and manual control. As shown in FIG. 15, one or more control buttons 48 can be positioned at any one of three different locations as identified by reference circles "D", "E", and "F" where the user 300 grips the pull rod 31. As shown in FIG. 16, one or more control buttons 48 can be positioned at the location as identified by reference circles "G" where the user 300 grips the pull rod 31. The control buttons 48 can be located on the top or sides of the top portion of the pull rod 31, and/or on the underside of the top portion of the pull rod 31.

Figure 17:
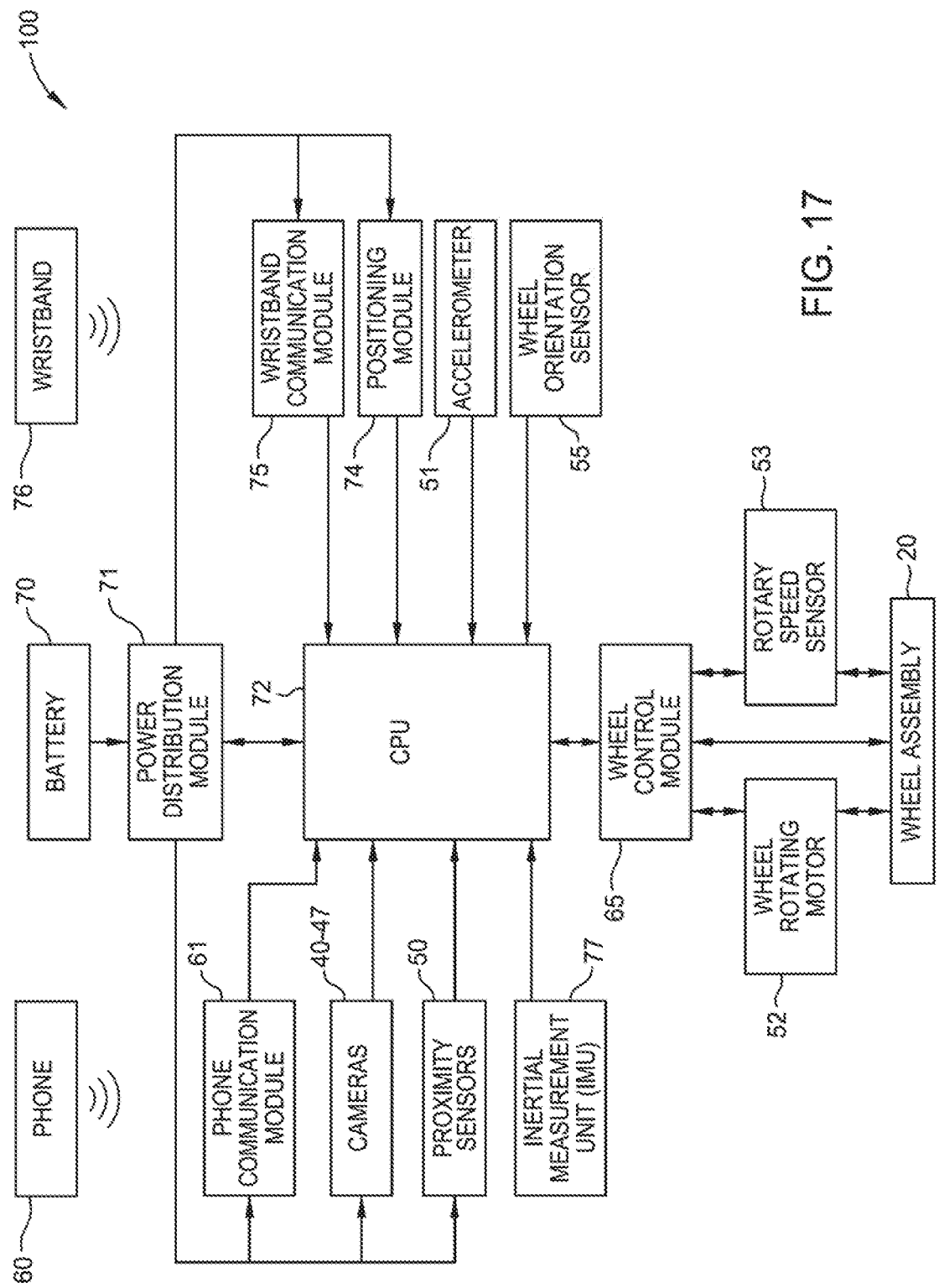
FIG. 17 is a block diagram of the smart luggage system according to one embodiment.

FIG. 17 is a block diagram of the smart luggage system 100 according to one embodiment. The smart luggage system 100 includes a battery 70 in communication with a power distribution module 71. The power distribution module 71 is configured to distribute power supplied by the battery 70 to the other components of the smart luggage system 100.

The smart luggage system 100 includes a central processing unit ("CPU") 72 in communication with a phone communication module 61 and a wristband communication module 75. The CPU 72 may be the same or a different CPU than the CPU 49 located in the top portion of the pull rod 31 as shown in FIG. 7. A cellular phone 60 and a wristband 76 are used to communicate with the phone communication module 61 and the wristband communication module 75, respectively, via ultra-wideband, radio frequency identification (active and/or passive), Bluetooth (low energy), WiFi, and/or any other form of communication known in the art. The cellular phone 60 and the wristband 76 are two examples of personal user devices that can be used with the smart luggage system 100. The cellular phone 60 and/or the wristband 76 are configured to allow a user to send instructions to the CPU 72 to control operation of the smart luggage system 100, and to receive information from the CPU 72 regarding the operation of the smart luggage system 100.

A positioning module 74 is configured to communicate information regarding the position of the luggage 10 to the CPU 72 and the user (via the cellular phone 60 and/or the wristband 76 for example). The positioning module 74 may include GPS (outdoor), WiFi access points (indoor), and/or Bluetooth beacons (indoor) so that the user can find the location of the smart luggage system 100 at any time, such as in the event that the smart luggage system 100 is lost. An accelerometer 51 is configured to communicate information regarding the overall acceleration and/or speed of the smart luggage system 100 to the CPU 72. A wheel orientation sensor 55 is configured to communicate information regarding the orientation of the motorized wheel assemblies 20 to the CPU 72.

The CPU 72 is also in communication with the upper and lower cameras 40, 41, 42, 43, 44, 45, 46, 47, the proximity sensors 50, an inertial measurement unit ("IMU") 77, and a wheel control module 65. The cameras 40-47 are configured to communicate information regarding the visual images and presence of nearby objects that the cameras 40-47 records and/or detects to the CPU 72. The proximity sensors 50 are configured to communicate information regarding the presence of objects near the smart luggage system 100 to the CPU 72. The IMU 77 is configured to communicate information regarding the dynamic movements of the smart luggage system 100, such as the pitch, roll, yaw, acceleration, and/or angular rate of the smart luggage system 100 to the CPU 72. For example, once the IMU 77 detects that the smart luggage system 100 is tilting or falling over, then the CPU 72 will instruct a wheel control module 65 to stop one or more wheel rotating motors 52 from rotating one or more of the wheel assemblies 20.

The wheel control module 65 is in communication with a rotary speed sensor 53 and the wheel rotating motor 52. The wheel control module 65 is configured to communicate information regarding the motorized wheel assemblies 20, such as the rotary speed measured by the rotary speed sensor 53, to the CPU 72. Although only one wheel control module 65 is shown, each wheel assembly 20 can include a separate wheel control module 65 in communication with the CPU 72. In one embodiment, the wheel control module 65 can be integrated into the CPU 72 as a single processing unit. According to one example, the CPU 72 includes a single wheel control module 65 to control all four wheel assemblies 20. According to one example, the CPU 72 includes four wheel control modules 65, one for each wheel assembly 20.

The CPU 72 is configured to analyze the information received from the various components (e.g. cameras 40-47, proximity sensors 50, modules 61, 65, 74, 75, etc.) of the smart luggage system 100 and perform the computational functions programmed into the CPU 72 based on the information to operate the smart luggage system 100 as described herein. For example, the CPU 72 is configured to determine a given direction and speed based on the information. The CPU 72 is configured to control the direction and speed of the smart luggage system 100 relative to a user and/or the surrounding environment. For example, the CPU 72 is configured to control the direction and the speed of the smart luggage system 100 through the wheel control module 65 by instructing the wheel control module 65 to increase, decrease, or stop power, e.g. input current, supplied to each respective motorized wheel assembly 20.

Figure 18:
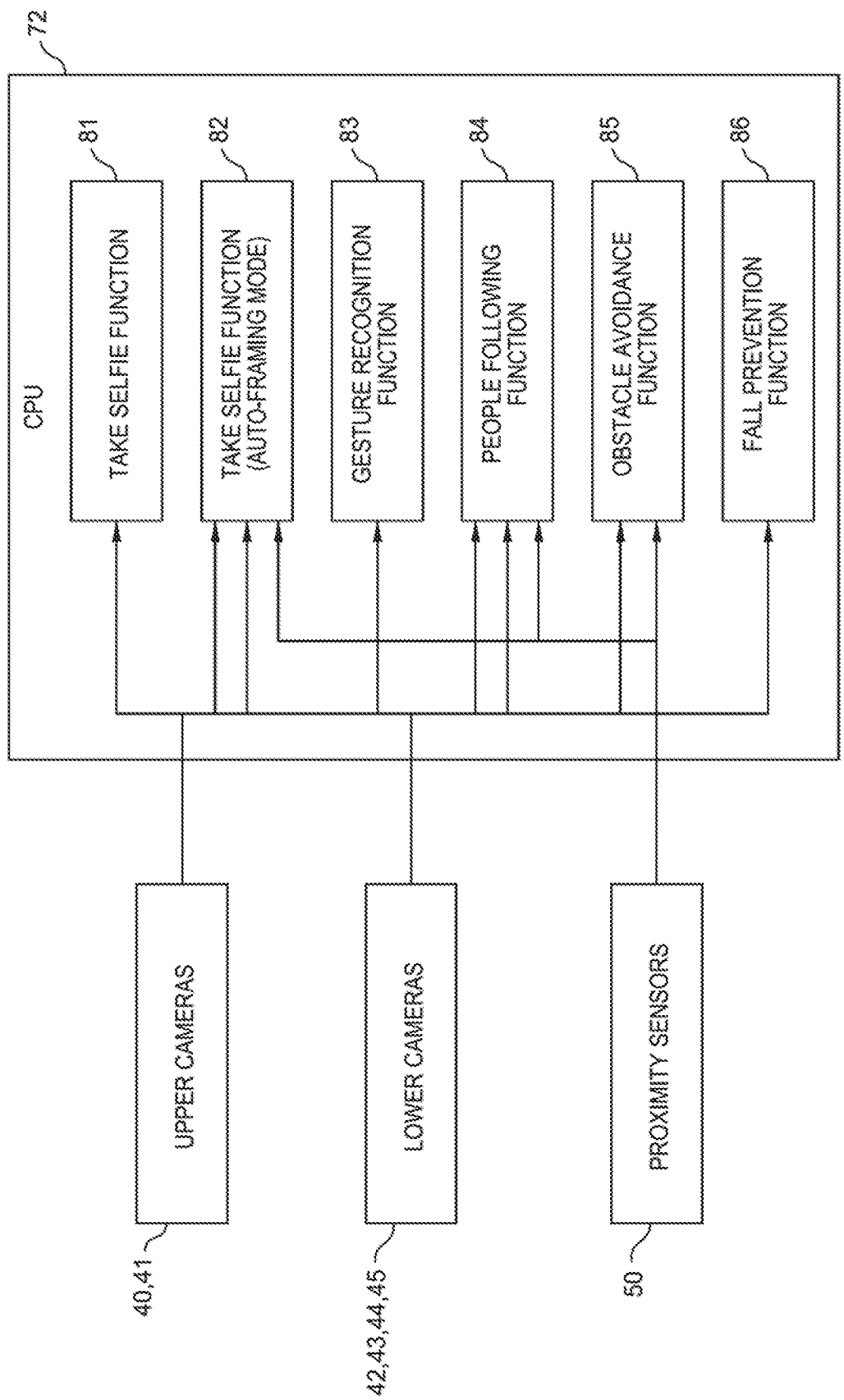
FIG. 18 is another block diagram of the smart luggage system according to one embodiment.

FIG. 18 is another block diagram of the smart luggage system 100 according to one embodiment. The CPU 72 may be pre-programmed with several functions directed to the operation of the smart luggage system 100. A take selfie function 81 is configured to help a user take a selfie photograph and/or video using any one of the upper cameras 40, 41. A take selfie function (with auto-framing mode) 82 is configured to help a user take a selfie photograph and/or video with auto-framing assistance using any one of the upper cameras 40, 41, the lower cameras 42, 43, 44, 45, and/or the proximity sensors 50.

A gesture recognition function 83 is configured to help detect a user based on a gesture provided by the user using any one of the upper cameras 40, 41. A people following function 84 is configured to maintain the smart luggage system 100 in a rear follow or side follow position relative to a user using any one of the upper cameras 40, 41, the lower cameras 42, 43, 44, 45, and/or the proximity sensors 50. An obstacle avoidance function 85 is configured to help the smart luggage system 100 avoid obstacle when moving in a given direction using any one of the lower cameras 42, 43, 44, 45, and/or the proximity sensors 50. A fall prevention function 86 is configured to help prevent the smart luggage system 100 from falling over using any one of the lower cameras 42, 43, 44, 45.

Figure 19:
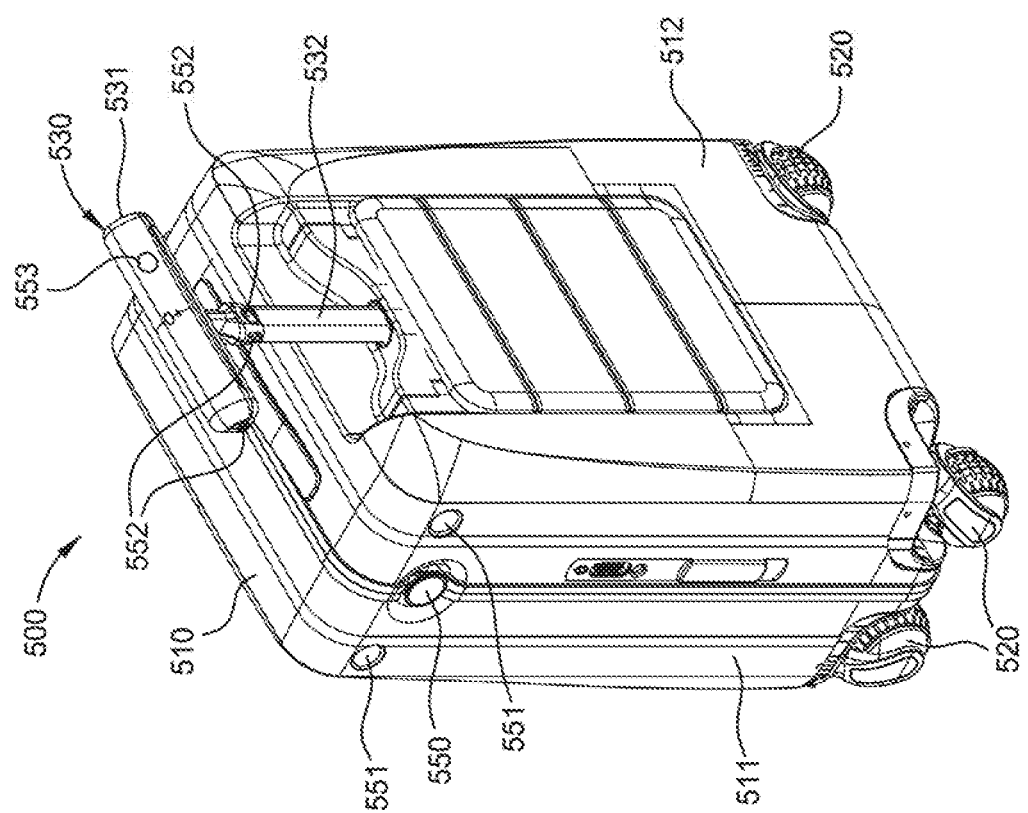
FIG. 19 is a perspective view of a smart luggage system according to one embodiment.

FIG. 19 is a perspective view of a smart luggage system 500 according to one embodiment. The smart luggage system 500 includes a body in the form of a piece of luggage 510, such as a suitcase, that can be used to store items for transport. The luggage 510 is supported by four wheel assemblies 520 that are configured to rotate in a given direction and roll in the given direction. The wheel assemblies may be motorized or non-motorized.

The smart luggage system 500 is similar to the smart luggage system 100 discussed above but may include one or more cameras 550 coupled to the luggage 510 and/or one or more cameras 552 coupled to a handle 530 of the luggage 510. One camera 550 is shown coupled to a front side 511 of the luggage 510 near the top end of the luggage 510. Three cameras 552 are shown coupled to front and right sides of the handle 530, and specifically coupled to a pull rod 531 of the handle 530, but can additionally or alternatively be coupled to a connecting rod 532 of the handle 530. Any number of cameras 550, 552 can be used and located at different positions and/or on any side of the luggage 510 and/or the handle 530.

A control button 551 is shown coupled to the front side 511 of the luggage 510, and a control button 553 is shown coupled to the pull rod 531 of the handle 530. The control button 553 may be the control button 48 as described above with respect to FIGS. 15 and 16. The control buttons 551, 553 are configured to activate the cameras 550, 552 so that a user can take photographs and/or videos using the cameras 550, 552. Any number of control buttons 551, 553 can be used and located at different positions and/or on any side of the luggage 510 and/or the handle 530.

Figure 20:
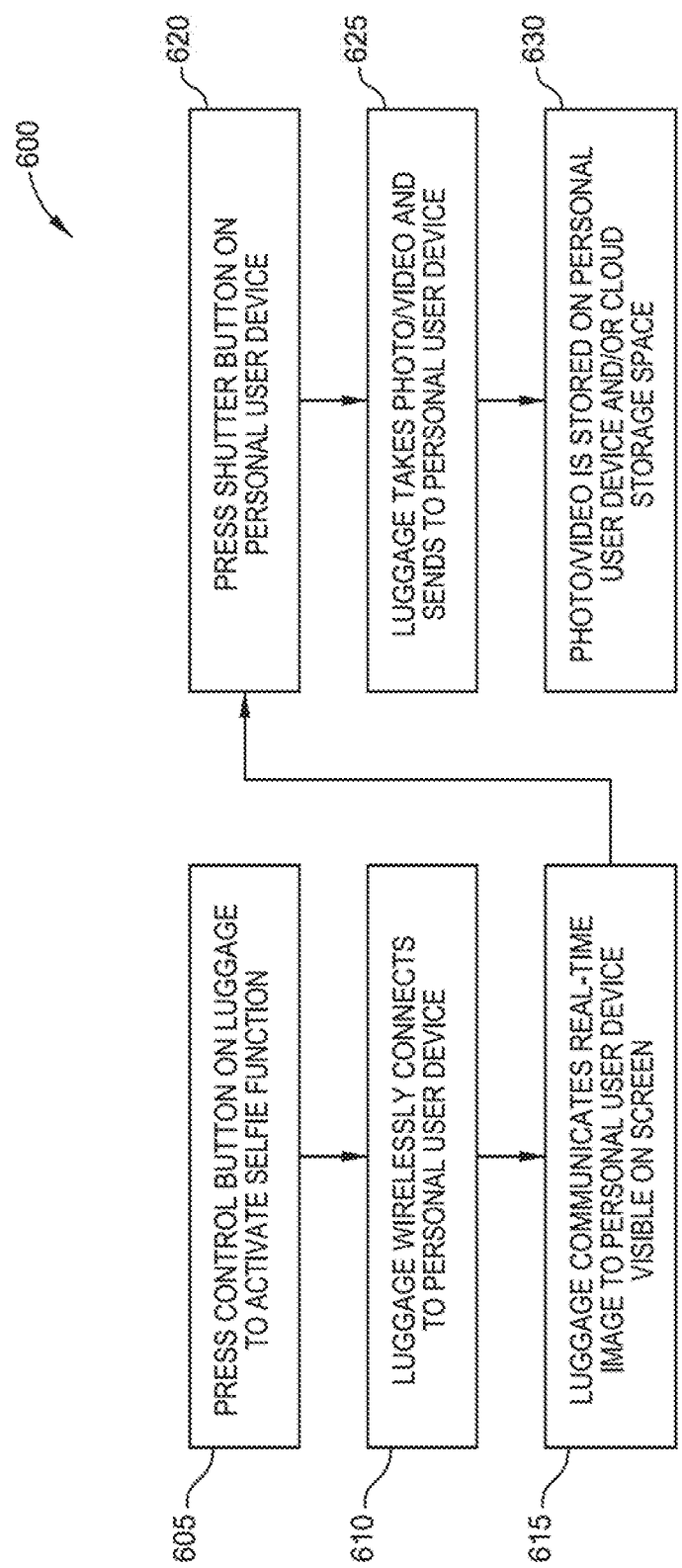
FIG. 20 is a flow chart of a method of taking a photograph and/or video using the smart luggage system according to one embodiment.

FIG. 20 is a flow chart of a method 600 of taking a photograph and/or video using the smart luggage systems 100 and/or 500 according to one embodiment. At step 605, a user presses a control button (such as control buttons 48, 551, 553) on the luggage and/or the handle (such as luggage 10, 510 and/or handle 30, 530) to activate any one of the cameras on the luggage and/or the handle to take a photograph and/or video. The control button is used to instruct a processing unit (such as CPUs 49, 72) to activate a selfie function to prepare the cameras to take the photograph and/or video. At step 610, the luggage, and specifically the processing unit, wirelessly connects to the personal user device (such as personal user device 400). At step 615, the processing unit of the luggage communicates a real-time image of an object within a viewing range of any one or more of the cameras of the systems 100, 500 to the personal user device such that the real-time image is viewable on the screen of the device. If needed, the user can adjust the position of the object and/or the luggage to obtain a better viewing angle with the camera on the luggage.

At step 620, the user presses a shutter button (such as control feature 450) on the personal user device to take a photograph and/or video of the object using the camera on the luggage and/or the handle. When the shutter button is pressed, the personal user device instructs the processing unit to take the photograph and/or video of the object using one of the cameras. At step 625, the luggage takes the photograph and/or video and sends it to the personal user device via the processing unit. At step 630, the photograph and/or video is stored on the personal user device and/or on a cloud storage space (e.g. an internet based memory storage system).

Figure 21:
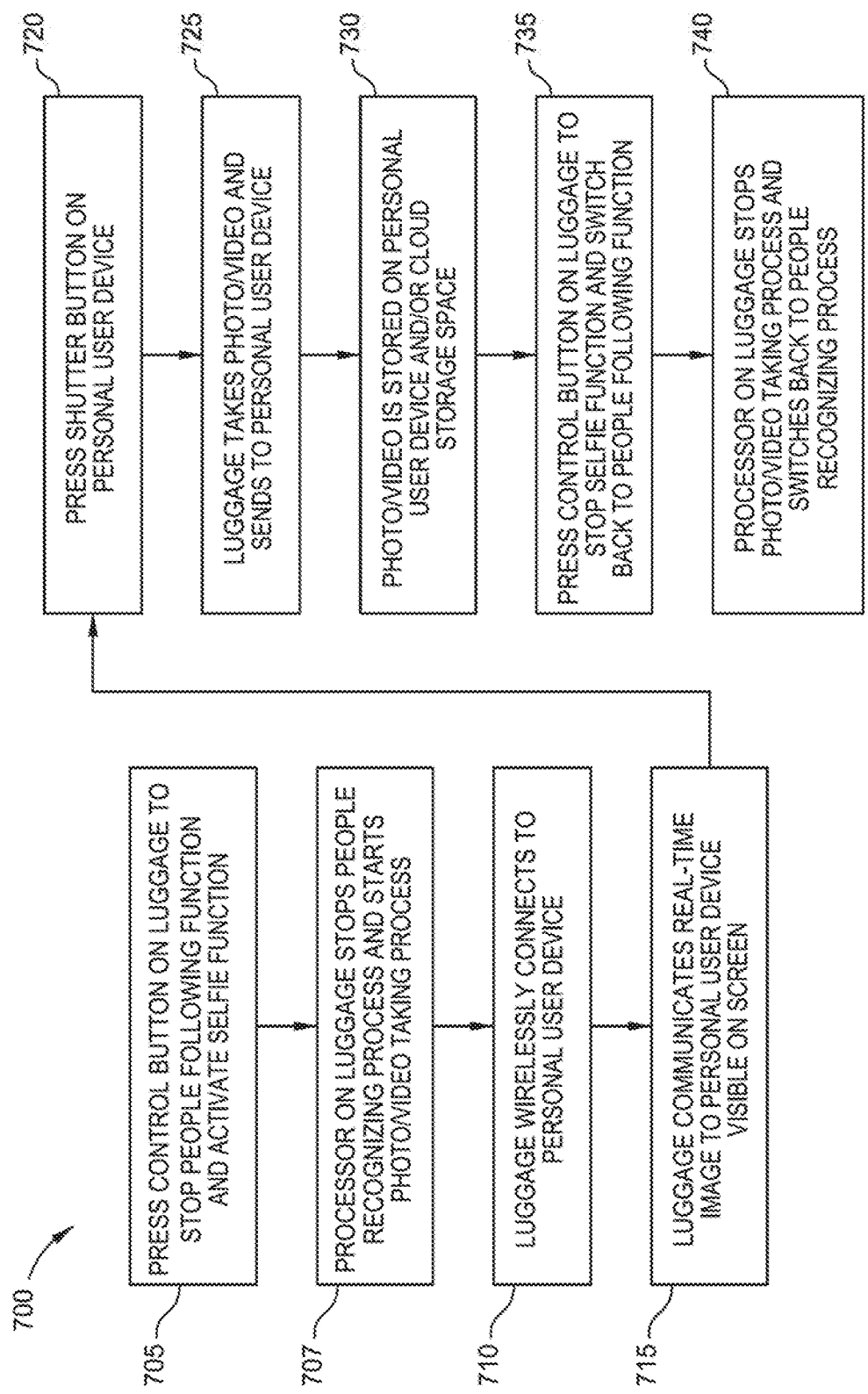
FIG. 21 is a flow chart of a method of taking a photograph and/or video using the smart luggage system according to one embodiment.

FIG. 21 is a flow chart of a method 700 of taking a photograph and/or video using the smart luggage systems 100 and/or 500 according to one embodiment. At step 705, a user presses a control button (such as control buttons 48, 551, 553) on the luggage and/or the handle (such as luggage 10, 510 and/or handle 30, 530) to stop the people following function and activate any one of the cameras on the luggage and/or the handle to take a photograph and/or video. When in the people following function, a processing unit (such as CPUs 49, 72) in the luggage is operating a people recognizing process to identify an object to follow, such as the user, and move the luggage in a side following position or a rear following position relative to the user.

The control button is used to instruct a processing unit to activate the selfie function to prepare the cameras to take the photograph and/or video. At step 707, the luggage, and specifically the processing unit, stops the people recognizing process and starts the photograph/video taking process of capturing real-time images. The photograph/video taking process may include adjusting the real-time image so that the user can see the photograph and/or video with vivid colors via the processing unit and/or the personal user device. The photograph/video taking process may also include adjusting the real-time image using tone mapping, gamma correction, color space conversion, white balance, edge enhancement, and/or contrast enhancement, etc., via the processing unit and/or the personal user device.

At step 710, the luggage, and specifically the processing unit, wirelessly connects to the personal user device (such as personal user device 400). At step 715, the processing unit of the luggage communicates the real-time image of an object within a viewing range of any one or more of the cameras of the systems 100, 500 to the personal user device such that the real-time image is viewable on the screen of the device. If needed, the user can adjust the position of the object and/or the luggage to obtain a better viewing angle with the camera on the luggage. At step 720, the user presses a shutter button (such as control feature 450) on the personal user device to take a photograph and/or video of the object using the cameras on the luggage and/or the handle.

When the shutter button is pressed, the personal user device instructs the processing unit to take the photograph and/or video of the object using one of the cameras. At step 725, the luggage takes the photograph and/or video and sends it to the personal user device via the processing unit. At step 730, the photograph and/or video is stored on the personal user device and/or on a cloud storage space (e.g. an internet based memory storage system).

At step 735, the user presses the control button on the luggage and/or the handle to stop the selfie function and switch back to the people following function. The control button is used to instruct the processing unit to stop the selfie function and switch back to the people following function. At step 740, the luggage, and specifically the processing unit, stops the photograph/video taking process and switches back to the people recognizing process to identify an object to follow, such as the user, and continue moving the luggage in a side following position or a rear following position relative to the user.

Figure 22:
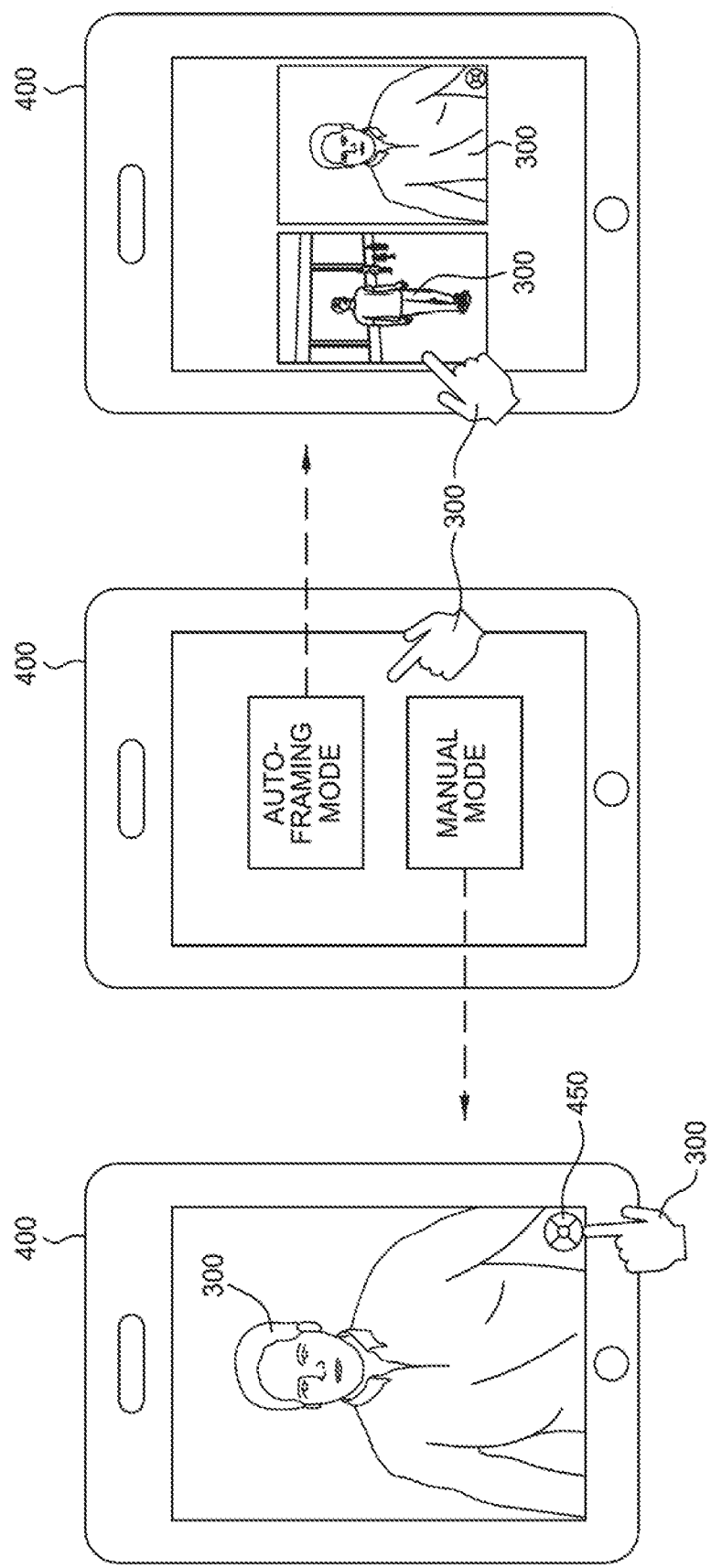
FIG. 22 is a schematic view of the smart luggage system taking a photograph and/or video and displaying the photograph and/or video on a personal user device.

FIG. 22 is a schematic view of the smart luggage system 100 taking a self-photograph and/or video using any one or all of the upper cameras 40, 41, and displaying the self-photograph and/or video on the personal user device 400. The user 300 can select an auto-framing mode or a manual mode on the personal user device 400 to control how to take the self-photograph and/or video using the smart luggage system 100. If the user 300 selects the manual mode, then the user 300 can move the smart luggage system 100 to the desired location via the control feature 450 while viewing the image on the screen of the personal user device 400 to capture the desired image. The user 300 can then press the control feature 450 to take the photograph and/or video.

If the user 300 selects the auto-framing mode, the user 300 can then select the style of photograph and/or video, specifically a full body photograph/video which captures the full body of the user 300, or a half body photograph/video which captures only half of the body of the user 300. After the user 300 selects the style, then the smart luggage system 100 is configured to move itself and find a location such that the user 300 will appear in the middle of the photograph and/or video. The smart luggage system 100 is also configured to match the selected style (e.g. full body or half body). After finding the location at which to take the photograph and/or video, the smart luggage system is configured to use the light on the luggage 10 or on the pull rod 30 to count down and indicate when it will take the photograph and/or video. In other words, the smart luggage system 100 will find a location, wait for a few seconds with a light indication, and then take the photograph and/or video.

Figure 23A:
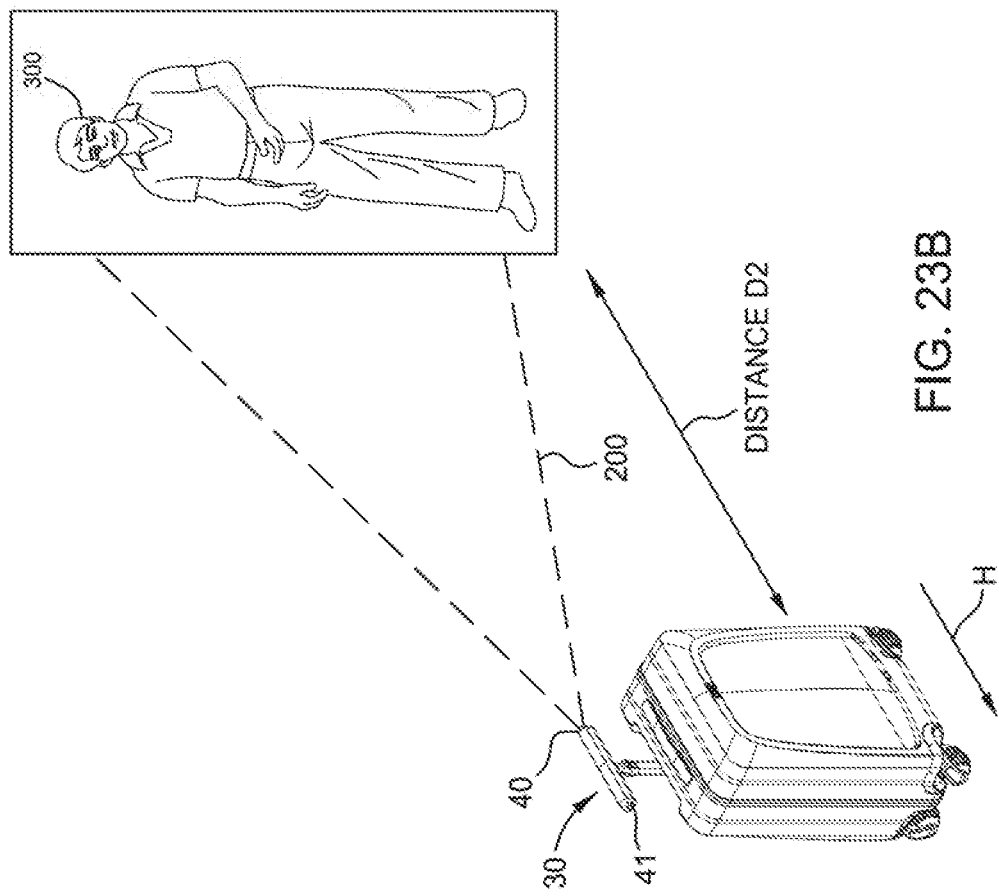
FIG. 23A is a schematic view of the smart luggage system taking a photograph and/or video at a first distance relative to a user.

FIG. 23A is a schematic view of the smart luggage system 100 taking a photograph and/or video of the user 300 when located at a first distance D1 relative to the user 300. As shown, the user 300 is located within the viewing range 200 of the camera 40 but is too close to the camera 40 such that only a portion of the user 300 is viewed. The user 300 can manually control the location of the smart luggage system 100 using the control feature 450 to adjust the distance for a better photograph and/or video.

Figure 23B:
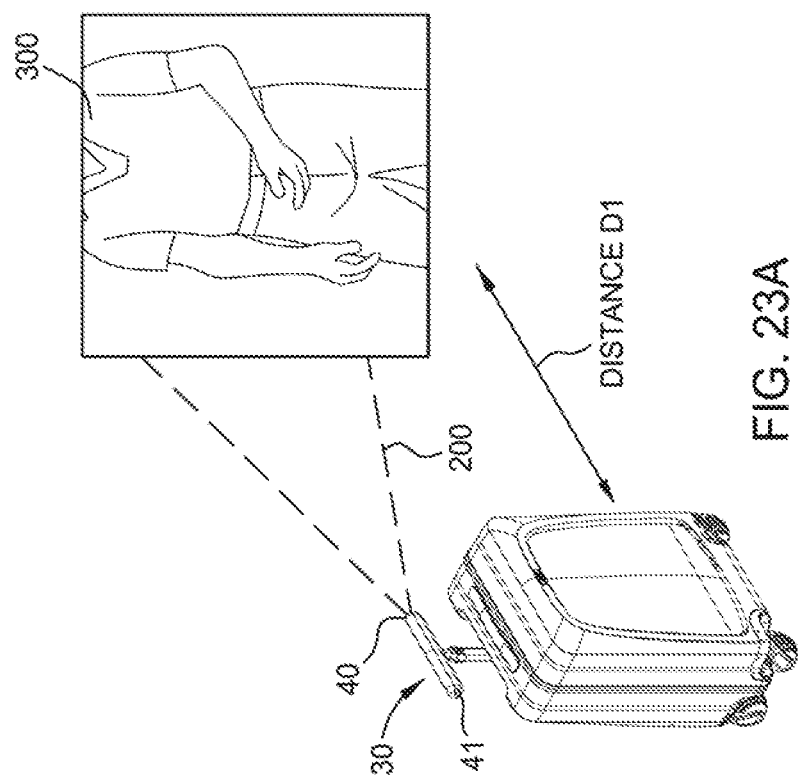
FIG. 23B is a schematic view of the smart luggage system taking a photograph and/or video at a second distance relative to the user.

As shown in FIG. 23B, if the user 300 selects the auto-framing mode, the smart luggage system 100 is configured to automatically move in a direction indicated by reference arrow "H" to a location that is at a second distance D2 relative to the user 300 to capture the selected style of photograph and/or video (e.g. full body or half body). Activating the auto-framing mode of the upper camera 40 (and/or any of the other cameras, e.g. upper camera 41) enables the smart luggage system 100 to autonomously find the user 300 and put the user 300 in the middle of the photograph and/or video by itself. When the appropriate location is found, the smart luggage system 100 will wait for a few seconds with a light indication and then take the photograph and/or video.

While the foregoing is directed to embodiments of the disclosure, other and further embodiments of the disclosure thus may be devised without departing from the basic scope thereof, and the scope thereof is determined by the claims that follow.

The invention claimed is:

1. A smart luggage system, comprising:
a piece of luggage configured to store items for transport;
a handle coupled to the luggage, wherein the handle includes a pull rod coupled to a connecting rod;
an upper camera disposed in a top portion of the pull rod, wherein the upper camera is configured to take a photograph and/or video and communicate the photograph and/or video to a personal user device, and wherein movement of the piece of luggage is configured to be controlled by the personal user device while a real-time image of an object within a viewing range of the upper camera is displayed on the personal user device.

2. The system of claim 1, wherein the upper camera includes an auto-framing mode configured to autonomously put the same or a different object in the middle of the photograph and/or video.

3. The system of claim 1, wherein the upper camera is configured to detect and record the same or a different object moving in a given direction while the luggage is in a rear follow position behind the object.

4. The system of claim 1, further comprising a lower camera disposed in a bottom portion of the pull rod, wherein the lower camera is configured to detect a proximity of the same or a different object relative to the luggage.

5. The system of claim 1, further comprising four motorized wheel assemblies coupled to the luggage and configured to move the luggage in a side follow position along a side of the same or a different object, and wherein the upper camera is located on a side of the pull rod facing the same or the different object when the luggage is in the side follow position and is configured to take the photograph and/or video when the luggage is in the side follow position to maintain the luggage in the side follow position as the same or the different object moves in a given direction.

6. The system of claim 1, further comprising four motorized wheel assemblies coupled to the luggage and configured to move the luggage in a rear follow position behind the same or a different object, and wherein the upper camera is located at a front end of the pull rod facing the same or the different object when the luggage is in the rear follow position and is configured to take the photograph and/or video when the luggage is in the rear follow position to maintain the luggage in the rear follow position as the same or the different object moves in a given direction.

7. A smart luggage system, comprising:
a piece of luggage configured to store items for transport;
a handle coupled to the luggage, wherein the handle includes a pull rod coupled to a connecting rod;
an upper camera disposed in a top portion of the pull rod, wherein the upper camera is configured to take a photograph and/or video and communicate the photograph and/or video to a personal user device as a real-time image of an object within a viewing range of the upper camera, and movement of the piece of luggage is configured to be controlled by the personal user device while the real-time image is displayed on the personal user device; and
a lower camera disposed in a bottom portion of the pull rod, wherein the lower camera is configured to detect a proximity of the same or a different object relative to the luggage to maintain the luggage in a side follow position or a rear follow position relative to the same or the different object as the same or the different object moves in a given direction.

8. The system of claim 7, wherein the upper camera includes an auto-framing mode configured to autonomously put the same or the different object in the middle of the photograph and/or video.

9. The system of claim 7, further comprising four motorized wheel assemblies coupled to the luggage and configured to move the luggage in the side follow position along a side of the same or the different object, and wherein the upper camera is located on a side of the pull rod facing the same or the different object when the luggage is in the side follow position and is configured to take the photograph and/or video when the luggage is in the side follow position to maintain the luggage in the side follow position as the same or the different object moves in a given direction.

10. The system of claim 7, further comprising four motorized wheel assemblies coupled to the luggage and configured to move the luggage in the rear follow position behind the same or the different object, and wherein the upper camera is located at a front end of the pull rod facing the same or the different object when the luggage is in the rear follow position and is configured to take the photograph and/or video when the luggage is in the rear follow position to maintain the luggage in the rear follow position as the same or the different object moves in a given direction.

11. A method of taking a photograph and/or video using a smart luggage system, comprising:
moving a handle of the smart luggage system from a collapsed position to an extended position, wherein the handle includes a pull rod coupled to a connecting rod, and wherein a camera is disposed in a top portion of the pull rod;
viewing in real-time an object that is within a viewing range of the camera on a personal user device;
moving the smart luggage system using a control feature on the personal user device while viewing in real-time the object on the personal user device; and
taking a photograph and/or video of the object using the camera.

12. The method of claim 11, further comprising operating the camera to take the photograph and/or video using the control feature on the personal user device.

13. The method of claim 11, further comprising activating an auto-framing mode such that the smart luggage system autonomously moves and puts the object in the middle of the photograph and/or video.

14. The method of claim 11, wherein the camera is located on a side of the pull rod facing the object when the luggage is in a side follow position along a side of the object, and further comprising taking the photograph and/or video with the camera when the luggage is in the side follow position to maintain the smart luggage system in the side follow position as the object moves in a given direction.

15. The method of claim 11, wherein the camera is located on a front end of the pull rod facing the object when the luggage is in a rear follow position behind the object, and further comprising taking the photograph and/or video with the camera when the luggage is in the rear follow position to maintain the smart luggage system in the rear follow position as the object moves in a given direction.

16. The method of claim 11, further comprising pressing a control button on the smart luggage system to stop a people following function and start a photo/video taking process.

17. The method of claim 16, further comprising pressing the control button on the smart luggage system to stop the photo/video taking process and switch back to the people following function.

\* \* \* \* \*